(12) United States Patent
Horiguchi et al.

(10) Patent No.: US 10,079,117 B2
(45) Date of Patent: Sep. 18, 2018

(54) ELECTRIC STORAGE DEVICE AND METHOD FOR MANUFACTURING THE SAME

(71) Applicant: Murata Manufacturing Co., Ltd., Nagaokakyo-shi, Kyoto-fu (JP)

(72) Inventors: Hiroki Horiguchi, Nagaokakyo (JP); Kyotaro Mano, Nagaokakyo (JP); Tatsuya Mizushima, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/661,154

(22) Filed: Jul. 27, 2017

(65) Prior Publication Data
US 2017/0330696 A1 Nov. 16, 2017

Related U.S. Application Data

(63) Continuation of application No. PCT/JP2016/050125, filed on Jan. 5, 2016.

(30) Foreign Application Priority Data

Jan. 30, 2015 (JP) ................................. 2015-017957

(51) Int. Cl.
*H01G 9/00* (2006.01)
*H01G 11/26* (2013.01)
(Continued)

(52) U.S. Cl.
CPC ............. *H01G 11/26* (2013.01); *H01G 11/30* (2013.01); *H01G 11/86* (2013.01); *H01M 2/26* (2013.01);
(Continued)

(58) Field of Classification Search
CPC ........ H01G 11/26; H01G 11/22; H01G 11/24; H01G 4/30; H01G 11/72; H01G 11/08;
(Continued)

(56) References Cited

U.S. PATENT DOCUMENTS 4,746,895 A 5/1988 Kato et al.
8,437,115 B2 * 5/2013 Kim .......................... H01G 4/30
361/311
(Continued)

FOREIGN PATENT DOCUMENTS

JP S58-73108 A 5/1983
JP S58-124936 U 8/1983
(Continued)

OTHER PUBLICATIONS

International Search Report issued in International Application No. PCT/JP2016/050125, dated Mar. 8, 2016.
(Continued)

*Primary Examiner* — Angel R Estrada
(74) *Attorney, Agent, or Firm* — Arent Fox LLP (57) ABSTRACT

A electric storage device that includes a device body having a first end face that has a first portion and a second portion, and second end face that has a third portion and a fourth portion. The second portion is inclined relative to the first portion, and the fourth portion is inclined relative to the third portion. A first electrode film extends from the first portion to the second portion, and a second electrode film extends from the third portion to the fourth portion.

18 Claims, 4 Drawing Sheets

(51) Int. Cl.
*H01G 11/30* (2013.01)
*H01G 11/86* (2013.01)
*H01M 2/26* (2006.01)
*H01M 10/04* (2006.01)
*H01M 10/0585* (2010.01)

(52) U.S. Cl.
CPC ....... *H01M 10/04* (2013.01); *H01M 10/0585* (2013.01)

(58) Field of Classification Search
CPC ........ H01G 11/28; H01G 11/78; H01G 11/00; H01G 11/80; H01G 11/10; H01G 11/12; H01G 11/30; H01G 11/86; H01M 2/263; H01M 2/26; H01M 2/30; H01M 4/64; H01M 4/00; H01M 10/04; H01M 10/0585
USPC .... 361/502, 500, 517, 306.3, 311, 305, 361, 361/321.1, 321.2, 321.3
See application file for complete search history.

(56) References Cited

U.S. PATENT DOCUMENTS

| | | | | |
|---|---|---|---|---|
| 8,587,922 B2* | 11/2013 | Togashi | ................. | H01G 4/012 |
| | | | | 361/311 |
| 8,630,083 B2* | 1/2014 | Ahn | ................. | H01G 4/30 |
| | | | | 361/306.3 |
| 8,974,947 B2* | 3/2015 | Fujii | ................. | H01G 11/06 |
| | | | | 361/502 |
| 9,013,859 B2* | 4/2015 | Saruban | ................. | H01G 4/005 |
| | | | | 361/306.3 |
| 9,036,331 B2* | 5/2015 | Yoon | ................. | H01G 4/30 |
| | | | | 361/321.4 |
| 9,558,893 B2 | 1/2017 | Horikawa et al. | | |
| 9,728,343 B2* | 8/2017 | Horikawa | ............. | H01G 11/24 |
| 9,748,046 B2* | 8/2017 | Ueda | ...................... | H01G 11/28 |
| 2014/0106213 A1 | 4/2014 | Horikawa et al. | | |
| 2015/0221448 A1 | 8/2015 | Horikawa et al. | | |
| 2015/0248970 A1 | 9/2015 | Ueda et al. | | |

FOREIGN PATENT DOCUMENTS

| | | |
|---|---|---|
| JP | S62-34417 U | 2/1987 |
| JP | S62-97314 A | 5/1987 |
| JP | S62-128514 A | 6/1987 |
| JP | H08-203773 A | 8/1996 |
| JP | H10-135064 A | 5/1998 |
| WO | WO 2013/001908 A1 | 1/2013 |
| WO | WO 2014/083919 A1 | 6/2014 |
| WO | WO 2014/083925 A1 | 6/2014 |

OTHER PUBLICATIONS

Written Opinion of the International Searching Authority issued in International Application No. PCT/JP2016/050125, dated Mar. 8, 2016.

Japanese Office Action dated Jul. 3, 2018 and issued for corresponding Japanese application 2016-571883 (English translation attached).

* cited by examiner

ELECTRIC STORAGE DEVICE AND METHOD FOR MANUFACTURING THE SAME

CROSS REFERENCE TO RELATED APPLICATIONS

The present application is a continuation of International application No. PCT/JP2016/050125, filed Jan. 5, 2016, which claims priority to Japanese Patent Application No. 2015-017957, filed Jan. 30, 2015, the entire contents of each of which are incorporated herein by reference.

FIELD OF THE INVENTION

The present invention relates to an electric storage device and a method for manufacturing the same.

BACKGROUND OF THE INVENTION

There are various known electric storage devices such as an electric double layer capacitor and a secondary battery. For example, Patent Document 1 describes an electric storage device that includes a first internal electrode drawn out from its first end face, a second internal electrode drawn out from its second end face, and a separator disposed between the first internal electrode and the second internal electrode. On the first end face, a first external electrode is electrically connected to the first internal electrode. On the second end face, a second external electrode is electrically connected to the second internal electrode.

Patent Document 1: International Publication No. WO 2014/083925

SUMMARY OF THE INVENTION

In electric storage devices, improvement in continuity between an internal electrode and an external electrode is desired to improve electric reliability.

An object of the present invention is to improve an electric storage device in electric reliability.

An electric storage device according to the present invention includes a device body, a first electrode film, and a second electrode film. The device body includes first and second principal faces, first and second side faces, and first and second end faces. The first and second principal faces extend along a lengthwise direction and a width direction. The first and second side faces extend along the lengthwise direction and a thickness direction. The first and second end faces each have a portion extending along the width direction and the thickness direction. In the device body, first and second internal electrodes are provided. The first electrode film is provided on the device body. The first electrode film is connected to the first internal electrode. The second electrode film is provided on the device body. The second electrode film is connected to the second internal electrode. The first end face has a first portion and a second portion. The first portion extends along the width direction and the thickness direction. The second portion is positioned along a periphery of the first portion. The second portion is inclined relative to the first portion. The second end face has a third portion and a fourth portion. The third portion extends along the width direction and the thickness direction. The fourth portion is positioned along a periphery of the third portion. The fourth portion is inclined relative to the third portion. The first electrode film is provided so as to extend from the first portion to the second portion. The second electrode film is provided so as to extend from the third portion to the fourth portion. Thus, the first and second electrode films extend to the second or fourth portion, so that the first and second electrode films tend to be difficult to detach from the device body. As a result, the first electrode film and the first internal electrode tend to be difficult to separate from each other. The second electrode film tends to be difficult to separate from the second internal electrode. Thus, the electric storage device according to the present invention has high electric reliability.

In the electric storage device according to the present invention, it is preferable that an edge portion of the first electrode film is positioned over the second portion, and that an edge portion of the second electrode film is positioned over the fourth portion.

In the electric storage device according to the present invention, it is preferable that the device body includes a function section provided with the first and second internal electrodes, and an exterior body with which a part of an external face of the function section is covered, and that at least a part of the first and third portions is formed of the function section, and the second and fourth portions are formed of the exterior body.

It is preferable that the electric storage device according to the present invention further includes a first metal cap with which a portion of the device body on a first end face side is covered, the first metal cap being electrically connected to the first electrode film, and a second metal cap with which a portion of the device body on a second end face side is covered, the second metal cap being electrically connected to the second electrode film. A gap is provided between the second portion and the first metal cap, and a gap is provided between the fourth portion and the second metal cap. In this case, the second portion and the first metal cap do not interfere with each other. The fourth portion and the second metal cap also do not interfere with each other. This enables adhesion between the first and second metal caps, and the first or second electrode film, to be improved.

In the electric storage device according to the present invention, it is preferable that the first and second electrode films each are formed of a sprayed film.

A method for manufacturing the electric storage device according to the present invention includes the steps of forming the device body, and spraying the first and second electrode films on the first and second end faces, respectively. In the step of spraying, spraying material is sprayed on the first and second end faces to form the first and second electrode films, respectively.

In the method for manufacturing the electric storage device according to the present invention, it is preferable that a plurality of the device bodies are disposed in the step of spraying such that the first end face of each of the device bodies faces the same direction, and that the spraying material is sprayed on the plurality of the device bodies. In this case, productivity of a plurality of electric storage devices can be improved.

In the method for manufacturing the electric storage device according to the present invention, it is preferable that the plurality of the device bodies are disposed at intervals in the step of spraying such that electrode films formed on the device bodies adjacent to each other are not joined to each other.

In the method for manufacturing the electric storage device according to the present invention, it is preferable that the plurality of the device bodies are disposed in the step of spraying such that a distance between the device bodies adjacent to each other is 110 or more.

In the method for manufacturing the electric storage device according to the present invention, spraying is performed in the step of spraying such that a thickness of each of the first and second electrode films is 100 μm to 140 μm.

In the method for manufacturing the electric storage device according to the present invention, it is preferable that the step of spraying includes the steps of disposing the plurality of the device bodies between a first tape and a second tape, at intervals in a longitudinal direction of the tapes, forming a wound body by winding the plurality of the device bodies, and forming the first and second electrode films by spraying the spraying material on the wound body.

In the method for manufacturing the electric storage device according to the present invention, it is preferable that the wound body is formed such that an edge portion of each of the first and second principal faces in the lengthwise direction is exposed from the first and second tapes. This enables the first and second electrode films to be formed with high form accuracy.

DETAILED DESCRIPTION OF PREFERRED EMBODIMENTS OF THE INVENTION

An example of preferable forms in which the present invention is practiced will be described below. An embodiment described below is shown only for example. The present invention is not limited to the embodiment described below.

In addition, a member with a substantially identical function is referred to as the same reference sign in each of drawings referred to in the embodiment and the like. Each of the drawings referred to in the embodiment and the like is schematically illustrated. A ratio of size and the like of an object drawn in each of the drawings may be different from an actual ratio of size and the like of the object.

A ratio of size of an object may also be different among the drawings. A ratio of size and the like of a specific object should be determined in consideration of descriptions below.

Figure 1:
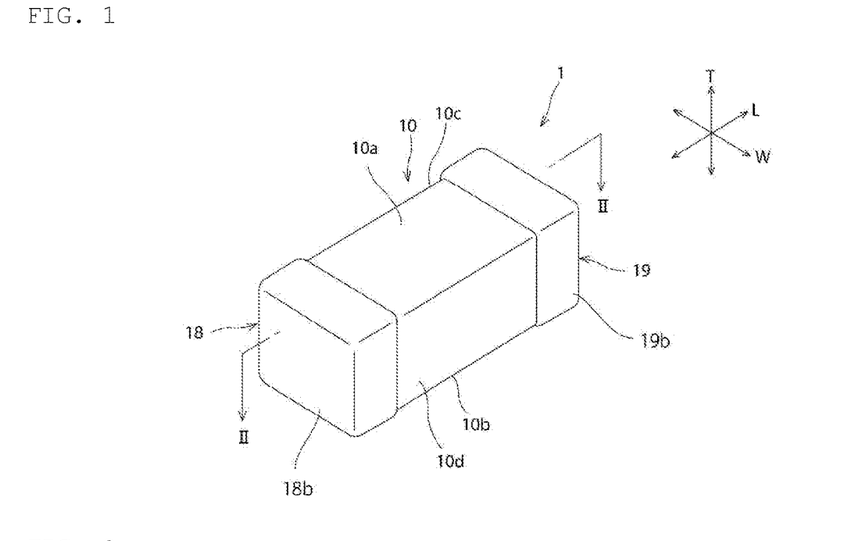
FIG. 1 is a schematic perspective view of an electric storage device according to an embodiment of the present invention.
Figure 2:
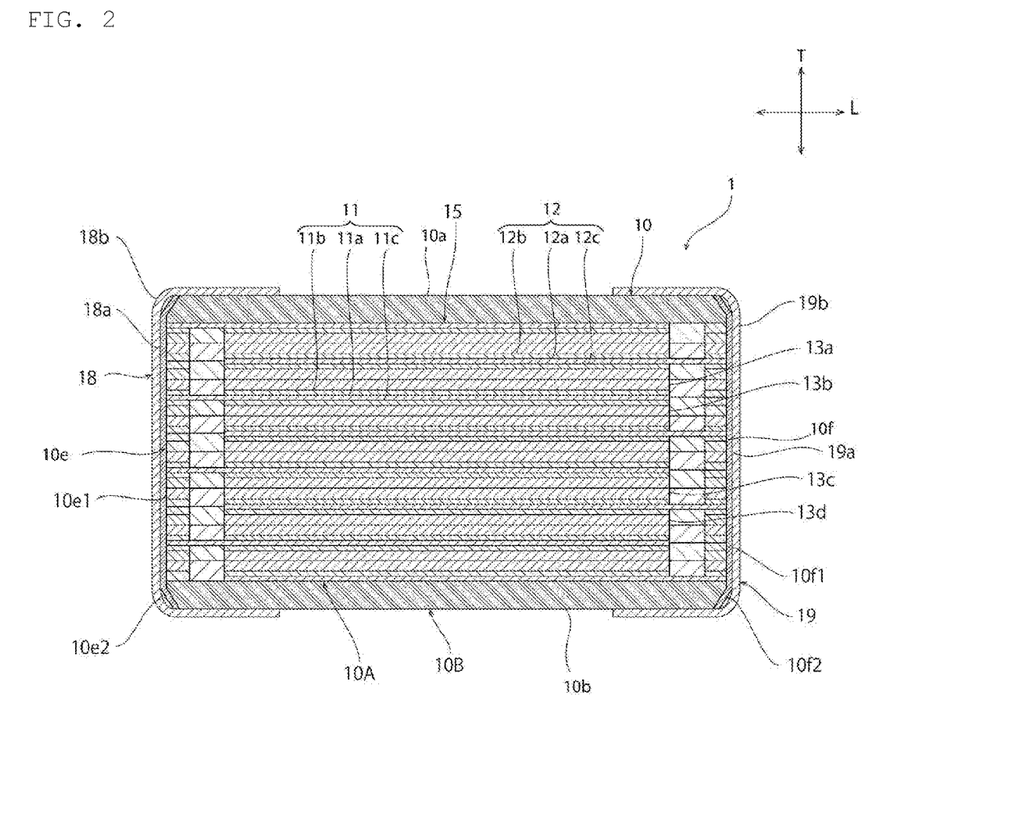
FIG. 2 is a schematic sectional view taken along line II-II of FIG. 1.
Figure 3:
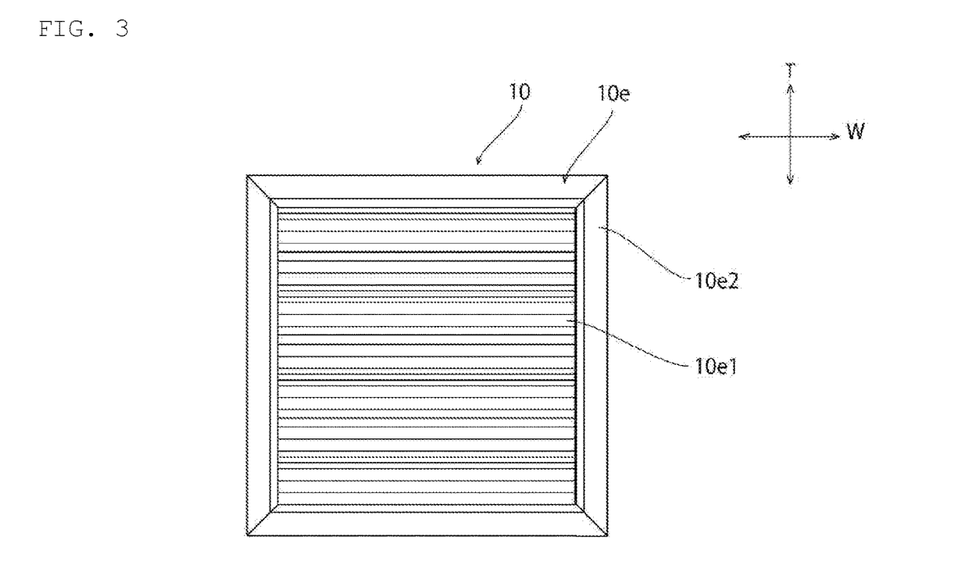
FIG. 3 is a schematic plan view of a first end face of a device body according to an embodiment of the present invention.

FIG. 1 is a schematic perspective view of an electric storage device according to the present embodiment. FIG. 2 is a schematic sectional view taken along line II-II of FIG. 1. FIG. 3 is a schematic plan view of a first end face of a device body in the present embodiment.

FIGS. 1 to 3 each illustrate an electric storage device 1 that constitutes an electric double layer capacitor, and a secondary battery.

The electric storage device 1 includes a device body 10. The device body 10 includes first and second principal faces 10a and 10b, first and second side faces 10c and 10d, and first and second end faces 10e and 10f. The first and second principal faces 10a and 10b each extend along a lengthwise direction L and a width direction W. The first principal face 10a and the second principal face 10b face each other in a thickness direction T. The first and second side faces 10c and 10d each extend along the lengthwise direction L and the thickness direction T. The first side face 10c and the second side face 10d face each other in the width direction W. A part of each of the first and second end faces 10e and 10f extends along the width direction W and the thickness direction T. The first end face 10e and the second end face 10f face each other in the lengthwise direction L. In the present embodiment, the device body 10 is formed in the shape of a substantially rectangular parallelepiped.

As illustrated in FIGS. 2 and 3, the first end face 10e includes a first portion 10e1 and a second portion 10e2. The first portion 10e1 extends along the width direction W and the thickness direction T. The second portion 10e2 is positioned around the periphery of the first portion 10e1. The second portion 10e2 connects the first portion 10e1, the first and second principal faces 10a and 10b, and the first and second side faces 10c and 10d, to each other. The second portion 10e2 is inclined relative to the first portion 10e1. Specifically, the second portion 10e2 extends outward from the first portion 10e1 and toward a central portion of the device body 10 in the lengthwise direction L.

As illustrated in FIG. 2, the second end face 10f also includes a third portion 10f1 and a fourth portion 10f2, similar to the first end face 10e. The third portion 10f1 extends along the width direction W and the thickness direction T. The fourth portion 10f2 is positioned around the periphery of the third portion 10f1. The fourth portion 10f2 connects to the third portion 10e1, the first and second principal faces 10a and 10b, and the first and second side faces 10c and 10d. The fourth portion 102 is inclined relative to the third portion 10f1. Specifically, the fourth portion 10f2 extends outward from the third portion 10f1 and toward the central portion of the device body 10 in the lengthwise direction L.

As illustrated in FIG. 2, the device body 10 includes a plurality of first internal electrodes 11, and a plurality of second internal electrodes 12. The first and second internal electrodes 11 and 12 are alternately provided in the thickness direction T.

The first internal electrode 11 is provided parallel to the first and second principal faces 10a and 10b. The first internal electrode 11 is drawn out from the first end face 10e, but is not drawn out from the second end face 10f or the first and second side faces 10c and 10d.

The first internal electrode 11 includes a first current collector 11a, and first active material layers 11b and 11c.

The first current collector 11a can be formed of a metal foil composed of at least a kind of metal, such as aluminum and copper, for example.

The first current collector 11a is provided on its one face with the first active material layer 11b, and the first active material layer 11c is provided on the other face of the first current collector 11a. The first active material layers 11b and 11c constitute a polarized electrode when the electric storage device 1 constitutes an electric double layer capacitor. In this case, it is preferable that the first active material layers 11b and 11c each contain carbon material such as active carbon.

The second internal electrode 12 is provided parallel to the first and second principal faces 10a and 10b. The second internal electrode 12 is drawn out from the second end face 10f, but is not drawn out from the first end face 10e or the first and second side faces 10c and 10d.

The second internal electrode 12 includes a second current collector 12a, and second active material layers 12b and 12c.

The second current collector 12a can be formed of a metal foil composed of at least a kind of metal, such as aluminum and copper, for example.

The second current collector 12a is provided on its one face with the second active material layer 12b, and the second active material layer 12c is provided on the other face of the second current collector 12a. The second active material layers 12b and 12c constitute a polarized electrode when the electric storage device 1 constitutes an electric double layer capacitor. In this case, it is preferable that the second active material layers 12b and 12c each contain carbon material such as active carbon.

The second active material layer 12c faces the first active material layer 11b. The second active material layer 12b faces the first active material layer 11c.

On the first active material layer 11b, a first electrolyte-containing layer 13a is provided. On the first active material layer 11c, a first electrolyte-containing layer 13b is provided. On the second active material layer 12b, a second electrolyte-containing layer 13c is provided. On the second active material layer 12c, a second electrolyte-containing layer 13d is provided.

Each of the electrolyte-containing layers 13a, 13b, 13c, and 13d contains an electrolyte. It is preferable that each of the electrolyte-containing layers 13a, 13b, 13c, and 13d is formed of a gel containing an electrolyte. For example, high molecule polyethylene oxide based resin or the like is available to the gel.

For example, an ionic liquid such as EMITFSI and EMIBF4, and a solvent such as propylene carbonate and acetonitrile, are available to the electrolyte.

The first active material layer 11b and the second active material layer 12c face each other through the first electrolyte-containing layer 13a and the second electrolyte-containing layer 13d. The first active material layer 11c and the second active material layer 12b face each other through the first electrolyte-containing layer 13b and the second electrolyte-containing layer 13c.

The device body 10 includes a function section 10A and an exterior body 10B. The function section 10A serves electric function as an electric storage device. The function section 10A includes the first and second internal electrodes 11 and 12, and the electrolyte-containing layers 13a, 13b, 13c, and 13d, described above.

A part of an external face of the function section 10A is covered with the exterior body 10B. Specifically, first and second principal faces of the function section 10A, and first and second side faces thereof, are covered with the exterior body 10B. The function section 10A has first and second end faces that are exposed from the exterior body 10B. Thus, the first and second principal faces 10a and 10b, and the first and second side faces 10c and 10d, are formed of the exterior body 10B. The first and second end faces 10e and 10f are formed of the function section 10A and the exterior body 10B.

On the first end face 10e, a first external electrode 18 is provided. The first external electrode 18 is electrically connected to the first internal electrode 11. The first external electrode 18 includes a first electrode film 18a and a first metal cap 18b.

The first electrode film 18a is connected to the first internal electrode 11. The first electrode film 18a is provided so as to cover the first end face 10e. Specifically, substantially the entire first end face 10e is covered with the first electrode film 18a. The first electrode film 18a is provided so as to extend from the first portion 10e1 to the second portion 10e2. The first electrode film 18a has an edge portion that is positioned over the second portion 10e2. The first electrode film 18a is not positioned over the first and second principal faces 10a and 10b, and the first and second side faces 10c and 10d.

A portion of the device body 10 on a first end face 10e side is covered with the first metal cap 18b. Specifically, a portion of each of the first end face 10e, the first and second principal faces 10a and 10b, and the first and second side faces 10c and 10d, on the first end face 10e side, is covered with the first metal cap 18b.

The first metal cap 18b is electrically connected to the first electrode film 18a.

A gap is provided between the first metal cap 18b and the second portion 10e2. As a result, the first metal cap 18b, the device body 10, and the first electrode film 18a, can be prevented from relative positional interference with each other.

On the second end face 10f, a second external electrode 19 is provided. The second external electrode 19 is electrically connected to the second internal electrode 12. The second external electrode 19 includes a second electrode film 19a and a second metal cap 19b.

The second electrode film 19a is connected to the second internal electrode 12. The second electrode film 19a is provided so as to cover the second end face 10f. Specifically, the second electrode film 19a is provided so as to cover substantially the entire second end face 10f. The second electrode film 19a is provided so as to extend from the third portion 10f1 to the fourth portion 10f2. The second electrode film 19a has an edge portion that is positioned over the fourth portion 10f2. The second electrode film 19a is not positioned over the first and second principal faces 10a and 10b, and the first and second side faces 10c and 10d.

A portion of the device body 10 on a second end face 10f side is covered with the second metal cap 19b. Specifically, a portion of each of the second end face 10e, the first and second principal faces 10a and 10b, and the first and second side faces 10c and 10d, on the second end face 10f side, is covered with the second metal cap 19b.

The second metal cap 19b is electrically connected to the second electrode film 19a.

A gap is provided between the second metal cap 19b and the fourth portion 10f2. As a result, the second metal cap 19b, the device body 10, and the second electrode film 19a, can be prevented from relative positional interference with each other.

In the present embodiment, the first and second electrode films 18a and 19a each are formed of a sprayed film. The first and second electrode films 18a and 19a each can be formed of at least one kind of metal selected from a group composed of Al, Cu, and Al—Si, for example.

The first and second metal caps 18b and 19b each can be formed of a base material containing an alloy (Fe-42Ni alloy), or a base material composed of aluminum or an aluminum alloy, and Ni/Ag plating with which an external face of the base material is covered, for example.

Detachment of an electrode film from a device body interrupts continuity between the electrode film and an internal electrode. This impairs a charging function of an electric storage device.

From a viewpoint of improving an electric storage device in electric reliability, it is important to prevent an electrode film from detachment. In the electric storage device 1 of the present embodiment, the first electrode film 18a is provided so as to extend from the first portion 10e1 to the inclined second portion 10e2. Thus, the first electrode film 18a tends to be difficult to detach from the first end face 10e. The second electrode film 19a is provided so as to extend from the third portion 10f1 to the inclined fourth portion 10f2. Thus, the second electrode film 19a tends to be difficult to detach from the second end face 10f. As a result, the electric storage device 1 has excellent electric reliability.

As described above, from a viewpoint of achieving excellent electric reliability of the electric storage device 1, it is preferable to provide the inclined second and fourth portions 10e2 and 10f2. Meanwhile, from a viewpoint of preventing deterioration in charging properties of the electric storage device 1, it is preferable to provide the second and fourth portions 10e2 and 10f2 in the exterior body 10B instead of the function section 10A. That is, it is preferable that the function section 10A includes at least a part of the first and third portions 10e1 and 10f1, and that the exterior body 10B includes the second and fourth portions 10e2 and 10f2.

In the present embodiment, there is described an example of the second and fourth portions 10e2 and 10f2 each of which is in a plane shape. However, the present invention is not limited to this structure. The second and fourth portions each may be formed of a curved face.

Subsequently, an example of a manufacturing method of an electric storage device 1 will be described with reference to FIGS. 4 to 7.

First, a device body 10 is formed. The device body 10 can be manufactured by a publicly known method, for example. Next, spraying material is sprayed on first and second end faces 10e and 10f of the device body 10 to form first and second electrode films 18a and 19a, respectively (the step of spraying). Then, the device body 10 is covered with the first and second metal caps 18b and 19b to enable the electric storage device 1 to be completed.

Subsequently, the step of spraying will be described in detail.

Figure 4:
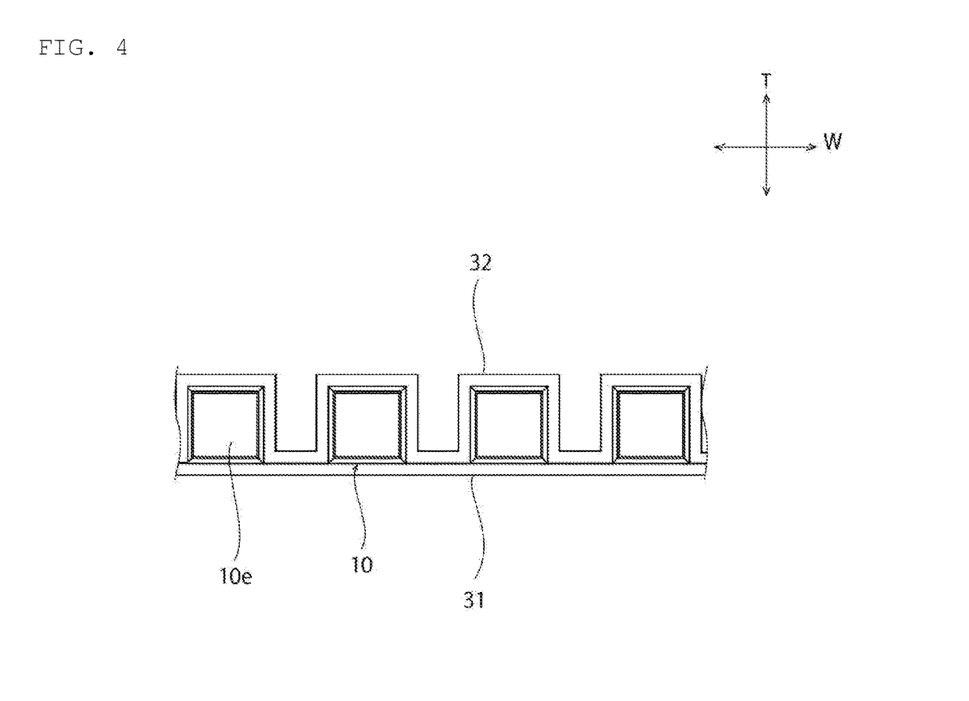
FIG. 4 is a schematic side view illustrating a manufacturing process of an electric storage device in an embodiment of the present invention.
Figure 5:
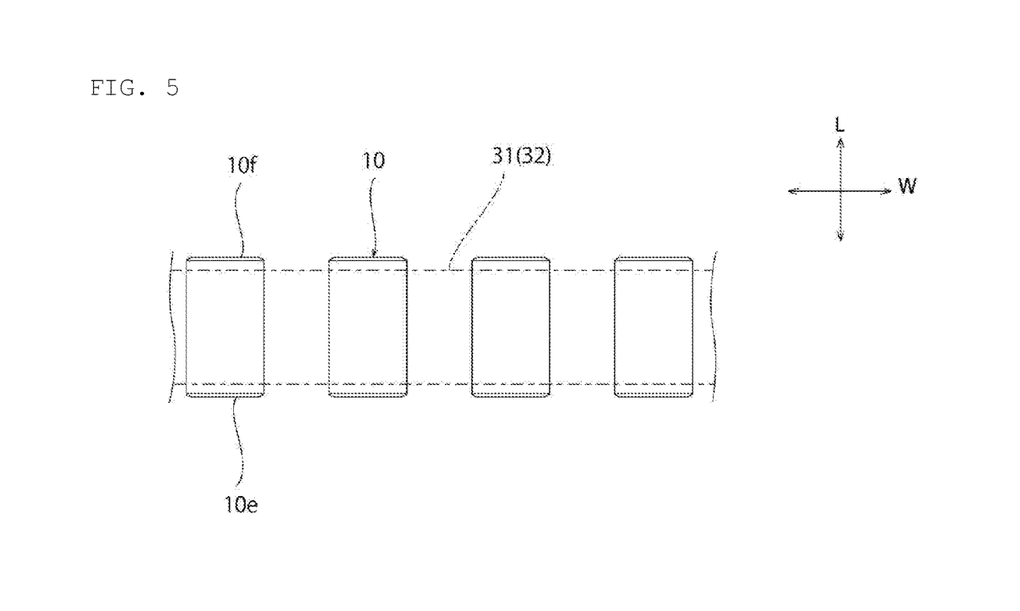
FIG. 5 is a schematic plan view illustrating a manufacturing process of an electric storage device in an embodiment of the present invention.
Figure 6:
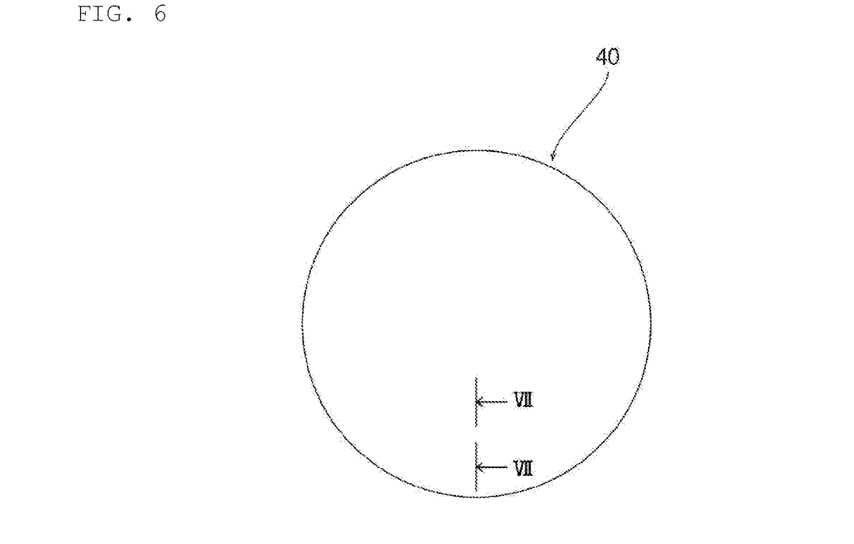
FIG. 6 is a schematic plan view illustrating a manufacturing process of an electric storage device in an embodiment of the present invention.
Figure 7:
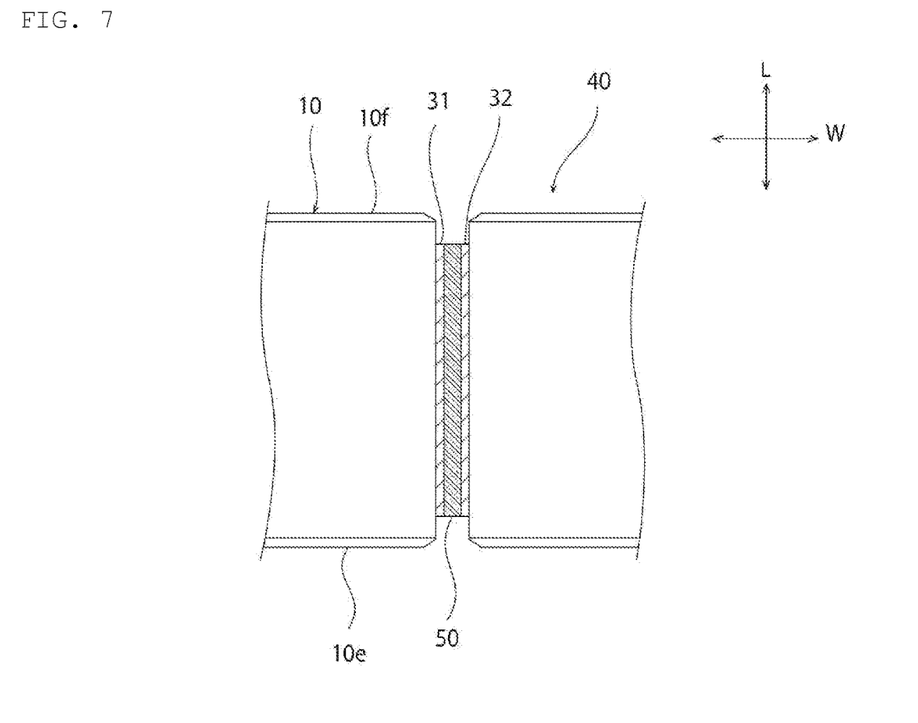
FIG. 7 is a schematic sectional view taken along line VII-VII of FIG. 6.

As illustrated in FIGS. 4 and 5, a plurality of the device bodies 10 is disposed between a first tape 31 and a second tape 32, at intervals in a longitudinal direction of the tapes 31 and 32, such that a first end face 10e of each of the device bodies 10 faces the same direction. Then, a layered body composed of the first and second tapes 31 and 32 between which the plurality of device bodies 10 is placed is wound to acquire a wound body 40 illustrated in FIG. 6. As illustrated in FIG. 7, the device bodies 10 are disposed adjacent to each other in the wound body 40. When the layered body is wound, a distance between the device bodies 10 adjacent to each other may be adjusted by providing a spacer 50 (refer to FIG. 7) between the tape 31 and the tape 32.

In the present embodiment, the second tape 32 forms a folded shape along a shape of the device bodies 10, and the first tape 31 forms a plate-like shape. The first tape 31 and the second tape 32 adhere to each other in a space between the device bodies 10 adjacent to each other. However, the present invention is not limited to this structure. For example, the first and second tapes 31 and 32 each may form a folded shape along the shape of the device bodies 10. In that case, a portion of each of the first and second tapes 31 and 32, which is positioned in a space between the device bodies 10 adjacent to each other, may be positioned in a central portion in a thickness direction of each of the device bodies 10.

Subsequently, spraying material is sprayed on the wound body 40 to form the first and second electrode films 18a and 19a. When the plurality of device bodies 10 is sprayed in the same process as described above, the first and second electrode films 18a and 19a can be efficiently formed.

In the step of spraying, it is preferable to perform spraying such that a thickness of each of the first and second electrode films 18a and 19a is to be not less than 100 μm and not more than 140 μm. A thickness of an electrode film can be acquired by measuring the thickness of the electrode film at its central portion in a thickness direction of an electric storage device in a section exposed by grinding a side face of an electric storage device until a dimension of the side face in a width direction of the electric storage device is halved.

It is preferable to form the wound body 40 such that edge portions of each of the first and second principal faces 10a and 10b in the lengthwise direction L are exposed from the first and second tapes 31 and 32, as illustrated in FIG. 5. For example, when edge portions of each of first and second principal faces in a lengthwise direction thereof are not exposed from first and second tapes, thickness at edge portions of an electrode film formed by spraying may be too thick. When the wound body 40 is formed such that the edge portions of the first and second principal face 10a and 10b in the lengthwise direction L are exposed from the first and second tapes 31 and 32, the edge portions of each of the electrode films 18a and 19a can be prevented from being too thick.

In the step of spraying, when a distance between the device bodies 10 adjacent to each other is too small, the sprayed films 18a and 19a formed on the device bodies 10 adjacent to each other may be joined to each other. In that case, the joined sprayed films 18a and 19a need to be divided. Thus, it is preferable that spraying is performed in the step of spraying, while the plurality of device bodies 10 is disposed at intervals such that the electrode films 18a and 19a formed on the device bodies 10 adjacent to each other are not joined to each other.

Figure 8:
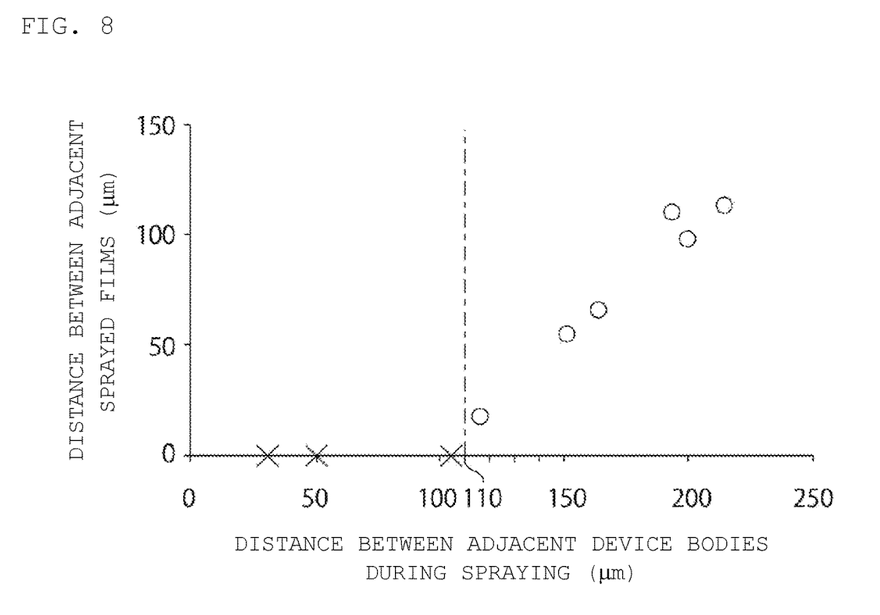
FIG. 8 is a graph showing a distance between adjacent device bodies during spraying and a distance between sprayed films formed on the adjacent device bodies in experimental examples 1 to 9.

FIG. 8 is a graph showing a distance between adjacent device bodies during spraying and a distance between sprayed films formed on the adjacent device bodies in experimental examples 1 to 9. From results shown in FIG. 8, it can be seen that when a distance between the adjacent device bodies 10 is set to 110 μm or more in the step of spraying, it is possible to reliably prevent the sprayed films 18a and 19a formed on the device bodies 10 disposed adjacent to each other from being joined to each other.

DESCRIPTION OF REFERENCE SYMBOLS

1: electric storage device
10: device body
10A: function section
10B: exterior body
10a: first principal face
10b: second principal face
10c: first side face
10d: second side face
10e: first end face 10e1: first portion
10e2: second portion
10f: second end face
10f1: third portion
10f2: fourth portion
11: first internal electrode
11a: first current collector
11b, 11c: first active material layer
12: second internal electrode
12a: second current collector
12b, 12c: second active material layer
13a, 13b: first electrolyte-containing layer
13c, 13d: second electrolyte-containing layer
18: first external electrode
18a: first electrode film
18b: first metal cap
19: second external electrode
19a: second electrode film
19b: second metal cap
31: first tape
32: second tape
40: wound body
50: spacer

The invention claimed is:

1. A electric storage device comprising:
a device body having a function section containing first and second internal electrodes, and an exterior body covering at least a part of the function section, the device body having first and second principal faces extending along a length direction and a width direction, first and second side faces extending along the length direction and a thickness direction, and first and second end faces each having a portion extending along the width direction and the thickness direction, the length, width and thickness directions being orthogonal to each other, wherein
at the first end face:
at least part of the functional section defines a first portion extending along the width direction and the thickness direction; and
the exterior body defines a second portion around a periphery of the first portion and inclined relative to the first portion,
at the second end face:
at least part of the functional section defines a third portion extending along the width direction and the thickness direction; and
the exterior body defines a fourth portion around a periphery of the third portion and inclined relative to the third portion;
a first electrode film electrically connected to the first internal electrode, the first electrode film extending from the first portion to the second portion of the first end face; and
a second electrode film electrically connected to the second internal electrode, the second electrode film extending from the third portion to the fourth portion of the second end face.

2. The electric storage device according to claim 1, wherein
a first edge portion of the first electrode film is positioned over the second portion, and
a second edge portion of the second electrode film is positioned over the fourth portion.

3. The electric storage device according to claim 1, further comprising:

a first metal cap electrically connected to the first electrode film; and
a second metal cap electrically connected to the second electrode film.

4. The electric storage device according to claim 3, wherein
the first metal cap is shaped such that a gap is provided between the second portion and the first metal cap, and
the second metal cap is shaped such that a gap is provided between the fourth portion and the second metal cap.

5. The electric storage device according to claim 1, wherein the first and second electrode films are sprayed films.

6. The electric storage device according to claim 1, wherein a thickness of each of the first and second electrode films is 100 μm to 140 μm.

7. The electric storage device according to claim 1, wherein the first and second electrode films each comprise at least one kind of metal selected from Al, Cu, and Al—Si.

8. The electric storage device according to claim 1, wherein the second portion and the fourth portion are each inclined toward a central portion of the device body in the length direction.

9. A method for manufacturing an electric storage device, the method comprising:
forming a device body having a function section containing first and second internal electrodes, and an exterior body covering at least a part of the function section, the device body having first and second principal faces extending along a length direction and a width direction, first and second side faces extending along the length direction and a thickness direction, and first and second end faces each having a portion extending along the width direction and the thickness direction, the length, width and thickness directions being orthogonal to each other, wherein
at the first end face:
at least part of the functional section defines a first portion extending along the width direction and the thickness direction; and
the exterior body defines a second portion around a periphery of the first portion and inclined relative to the first portion,
at the second end face:
at least part of the functional section defines a third portion extending along the width direction and the thickness direction; and
the exterior body defines a fourth portion around a periphery of the third portion and inclined relative to the third portion; and
spraying a spraying material on the first and second end faces to form first and second electrode films, respectively, the first electrode film extending from the first portion to the second portion of the first end face, and the second electrode film extending from the third portion to the fourth portion of the second end face.

10. The method for manufacturing the electric storage device according to claim 9, wherein during the spraying, a plurality of the device bodies are disposed such that the first end face of each of the device bodies faces in the same direction, and the spraying material is sprayed on the plurality of the device bodies.

11. The method for manufacturing the electric storage device according to claim 10, wherein the plurality of device bodies are disposed at intervals such that first and second electrode films formed on device bodies that are adjacent to each other are not joined to each other.

12. The method for manufacturing the electric storage device according to claim 10, wherein the plurality of the device bodies are disposed such that a distance between adjacent device bodies is 110 µm or more.

13. The method for manufacturing the electric storage device according to claim 9, wherein the spraying is performed such that a thickness of each of the first and second electrode films is 100 µm to 140 µm.

14. The method for manufacturing the electric storage device according to claim 9, wherein the step of spraying includes:
   disposing the plurality of the device bodies between a first tape and a second tape at intervals;
   forming a wound body by winding the plurality of the device bodies; and
   forming the first and second electrode films by spraying the spraying material on the wound body.

15. The method for manufacturing the electric storage device according to claim 14, wherein the wound body is formed such that an edge portion of each of the first and second principal faces is exposed from the first and second tapes.

16. The method for manufacturing the electric storage device according to claim 9, further comprising:
   electrically connecting a first metal cap to the first electrode film; and
   electrically connecting a second metal cap to the second electrode film.

17. The method for manufacturing the electric storage device according to claim 16, further comprising:
   shaping the first metal cap such that a gap is provided between the second portion and the first metal cap, and
   shaping the second metal cap such that a gap is provided between the fourth portion and the second metal cap.

18. The method for manufacturing the electric storage device according to claim 9, wherein the second portion and the fourth portion are each inclined toward a central portion of the device body in the length direction.

* * * * *